US011237629B2

(12) United States Patent
von und zu Liechtenstein

(10) Patent No.: US 11,237,629 B2
(45) Date of Patent: *Feb. 1, 2022

(54) SOCIAL NETWORKING TECHNIQUE FOR AUGMENTED REALITY

(71) Applicant: Maximilian Ralph Peter von und zu Liechtenstein, Douglas (IM)

(72) Inventor: Maximilian Ralph Peter von und zu Liechtenstein, Douglas (IM)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,764

(22) Filed: Oct. 20, 2020

(65) Prior Publication Data
US 2021/0041950 A1 Feb. 11, 2021

Related U.S. Application Data

(63) Continuation-in-part of application No. 17/013,604, filed on Sep. 6, 2020, now Pat. No. 10,845,875, which is a continuation of application No. 16/406,954, filed on May 8, 2019, now Pat. No. 10,782,778, which is a continuation of application No. 15/017,606, filed on Feb. 6, 2016, now Pat. No. 10,341,352.

(51) Int. Cl.
| | | |
|---|---|---|
| *G06F 3/01* | (2006.01) | |
| *G06K 9/00* | (2006.01) | |
| *G06F 3/0482* | (2013.01) | |
| *G06Q 30/02* | (2012.01) | |
| *G06T 11/00* | (2006.01) | |
| *G06F 16/9536* | (2019.01) | |
| *G06Q 50/00* | (2012.01) | |
| *G06F 3/0484* | (2013.01) | |

(52) U.S. Cl.
CPC ............ *G06F 3/013* (2013.01); *G06F 3/0482* (2013.01); *G06F 3/04847* (2013.01); *G06F 16/9536* (2019.01); *G06K 9/00228* (2013.01); *G06K 9/00362* (2013.01); *G06Q 30/0205* (2013.01); *G06Q 50/01* (2013.01); *G06T 11/00* (2013.01)

(58) Field of Classification Search
None
See application file for complete search history.

(56) References Cited

U.S. PATENT DOCUMENTS

| | | | | |
|---|---|---|---|---|
| 8,854,282 B1* | 10/2014 | Wong | ................... | G02B 27/017 |
| | | | | 345/8 |
| 2013/0110827 A1* | 5/2013 | Nabar | ................. | G06F 16/9535 |
| | | | | 707/728 |
| 2014/0160250 A1* | 6/2014 | Pomerantz | ......... | H04N 5/23229 |
| | | | | 348/47 |
| 2015/0171926 A1* | 6/2015 | Coelho | ................ | H04B 5/0025 |
| | | | | 455/41.2 |

(Continued)

*Primary Examiner* — Jwalant Amin

(57) ABSTRACT

A gaze initiated interaction technique for facilitating social networking in augmented reality. Methods are shown which allow users to interact with each other following an event of interlocking gaze. Methods are also shown which allows tagging using augmented reality filters following a gaze interlock. Methods are also introduced to allow an augmented reality target to determine themselves how they would like to be enhanced in augmented reality following gaze interlocks. This disclosure also introduces a device for social networking in augmented reality which comprises a gaze-interlock event detection circuit and a gaze-interlock event processing unit.

19 Claims, 11 Drawing Sheets

(56) References Cited

U.S. PATENT DOCUMENTS

| | | | |
|---|---|---|---|
| 2015/0245079 A1* | 8/2015 | Tremblay | H04H 20/38 |
| | | | 725/116 |
| 2016/0005233 A1* | 1/2016 | Fraccaroli | G02B 27/0172 |
| | | | 345/633 |
| 2016/0295401 A1* | 10/2016 | Berge | H04L 63/0407 |
| 2016/0316503 A1* | 10/2016 | Raphael | H04W 76/11 |

* cited by examiner

SOCIAL NETWORKING TECHNIQUE FOR AUGMENTED REALITY

CROSS REFERENCE TO RELATED APPLICATIONS

This application is a continuation in part of the following U.S. patent application, which is incorporated by reference in its entirety:

U.S. Non-Provisional application Ser. No. 17/013,604, filed Sep. 6, 2020, which is a continuation of the following U.S. patent application, which is incorporated by reference in its entirety:

U.S. Non-Provisional application Ser. No. 16/406,954, filed May 8, 2019, which is a continuation of the following U.S. patent application, which is incorporated by reference in its entirety:

U.S. Non-Provisional application Ser. No. 15/017,606, filed Feb. 6, 2016.

STATEMENT REGARDING FEDERALLY SPONSORED RESEARCH OR DEVELOPMENT

Not applicable to this application.

BACKGROUND

Field

Example embodiments in general relate to a gaze initiated interaction technique for inviting, initiating and performing interaction between wearers of head-mountable devices.

Prior Art

Any discussion of the related art throughout the specification should in no way be considered as an admission that such related art is widely known or forms part of common general knowledge in the field.

With the advent of wearable devices the concept of point-of-interest beacons has received an increasing amount of attention in recent years, with the iBeacon technology becoming more and more prevalent. Current technology is centered around beacons being assigned unique identifiers, such as UUIDs, and configuring these beacons to transmit their static and permanent identifiers with a low range omnidirectional transmitter, such as Bluetooth LE. Whilst this technology is particularly suited to allow interfacing the point-of-interface beacons of large and inanimate objects, such as buildings or storefronts, there are a number of shortcomings which currently stand in the way of using point-of-interest beacons to facilitate interpersonal communication.

SUMMARY

This disclosure provides, in part, a group of methods.

One method includes detecting the gaze of a person wearing a head-mounted device and providing means for interacting with that person. Several means are known that allow detecting beacons associated with points-of-interest in an augmented reality environment. However, when a point-of-interest is associated with a person that person may not desire being tracked or contacted by an unrestricted group of people. The method also provides a means to authenticate against a point-of-interest beacon through mediation of a remote network, such as a social network.

Another method includes enabling the user of a head-mountable device to invite interaction from other members of a shared network. The method includes providing a means for the beacon user to restrict visibility and interaction with regards to other users. Therefore the beacon user remains anonymous to other users of similar head-mountable devices and only becomes visible to a select group of members of a network. The method includes a means to configure the head-mountable device to project the beam of the point-of-interest beacon in the direction of the user's gaze.

Another method includes configuring a remote service to provide authorization for interaction with a point-of-interest. The server determines whether access should be granted based on inclusion or exclusion criteria set in user profiles. If access is granted, the function returns an interface to the point-of-interest.

This disclosure also provides, in part, a system of a head mounted device (HMD). The system includes a directional beacon transmitting a unique identifier. The unique identifier may be changed in regular intervals such as to avoid tracking and to provide a degree of privacy and anonymity. The system may implement the directional point-of-interest beacon with an infrared light source. The system also includes a means for receiving a directional point-of-interest beacon, which may be implemented by an infrared-spectrum camera pointing in the same direction as the gaze of the user.

There has thus been outlined, rather broadly, some of the features of the gaze initiated interaction technique in order that the detailed description thereof may be better understood, and in order that the present contribution to the art may be better appreciated. There are additional features of the gaze initiated interaction technique that will be described hereinafter and that will form the subject matter of the claims appended hereto. In this respect, before explaining at least one embodiment of the gaze initiated interaction technique in detail, it is to be understood that the gaze initiated interaction technique is not limited in its application to the details of construction or to the arrangements of the components set forth in the following description or illustrated in the drawings. The gaze initiated interaction technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Among the techniques known in the prior art are those point-of-interest beacons which transmit static identifiers, commonly UUIDs (universally unique identifiers). Even though a UUID can be anonymous at the point of creation, once it has been associated with a person it can be used to track that person, which is considered a disadvantage in any scenario involving a requirement of privacy. The present invention, in part, provides a technique which allows the user of head-mountable device to publicly broadcast a constantly changing identifier thus making it difficult to track or identify the beacon user. At the same time the broadcast identifier can serve the function to invite interaction from a select group of member of a shared network, such as a shared social network. Importantly the novel technique does not necessarily restrict interaction to other network users, i.e. social network friends, previously associated with the beacon user. The technique also provides methods which allow beacon users to restrict access by setting profile filtering criteria, such as by setting which profile parameters another social network user must exhibit in order to be allowed to interface with the beacon user. Therefore the novel technique offers, in part, the possibility that a social network, for example, can mediate authentication and authorization between beacon users. Other than authentication and authorization, the technique can also serve to select and serve the appropriate interface for interaction. There may be a number of augmented-reality apps, which can provide such interface. The disclosed technique will allow a social network to select the most appropriate interface based on an algorithm taking into account both user profiles and the context of a gaze interlock event. The technique which is subject to this invention also proposes a system of a head-mountable device comprising a beacon system, whereby both the transmitter and the receiver beam are envisaged to be directional, whereas prior art embodiments of such beacons tend to be omnidirectional. The reason for seeking directional beams lies in solving the problem of how find a technological equivalent to the basic human interaction of the gaze of two persons meeting. In a preferred embodiment the directional beacon transmitter is implemented as a directional beam of light in the infrared spectrum, whereas the directional beacon receiver is implemented as an infrared-spectrum camera facing the same direction as the gaze of the user of a head-mountable device.

Figure 1A:
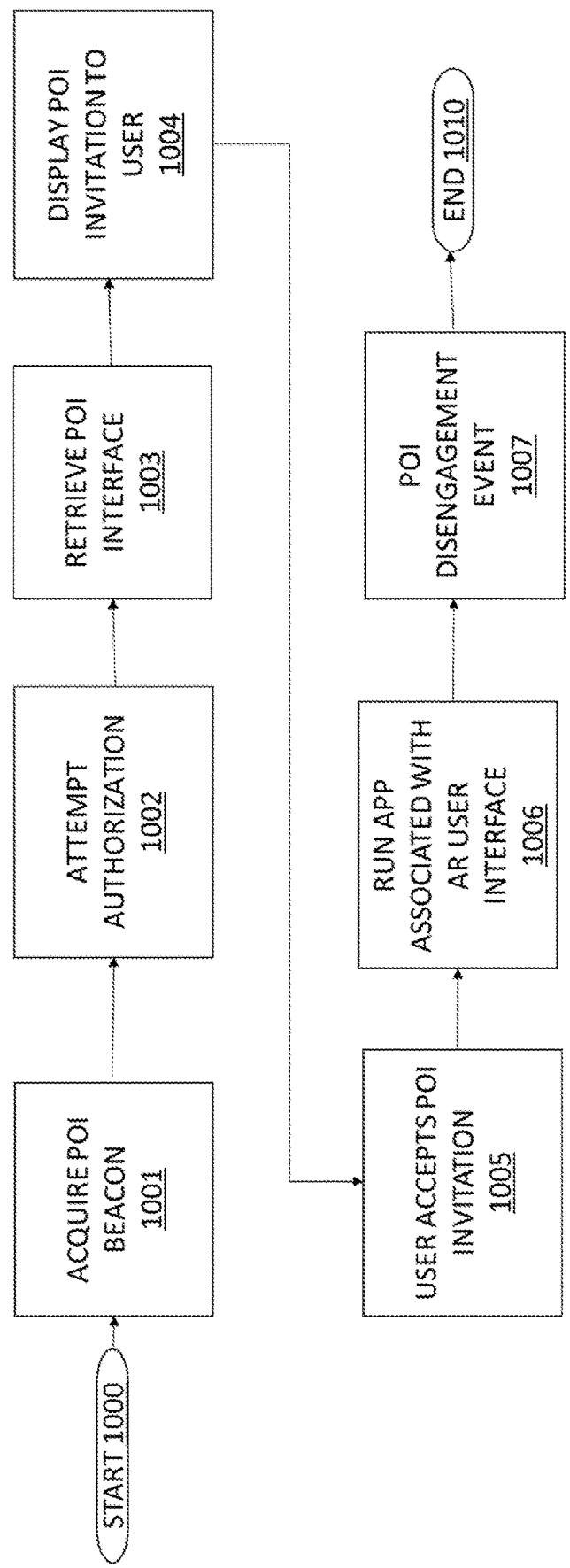
FIG. 1A is a block diagram of an example embodiment.

The block diagram of FIG. 1A illustrates the process flow of a beacon interaction from the perspective of the user of a head-mounted device looking to interact with other users. The process starts 1000 with a personal point-of-interest beacon being acquired 1001. At this point the user has only an anonymous identifier to go by and requires authorization 1002 before the anonymous identifier can be used for any kind of purpose. The authorization is requested from a remote server which can look up the anonymous identifier and match it with a profile on a network, such as a social network. As long as the authorization process is successful, the remote server returns a handle to an interface 1003. Once an interface to the point of interest is available the user is given the option to commence interaction with the point-of-interest 1004. If the user accepts that invitation for interaction 1005, then an application is started which is capable of using the interface returned in step 1003. The application is executed until a disengagement event 1007 is received, which ends 1008 the interaction.

Figure 1B:
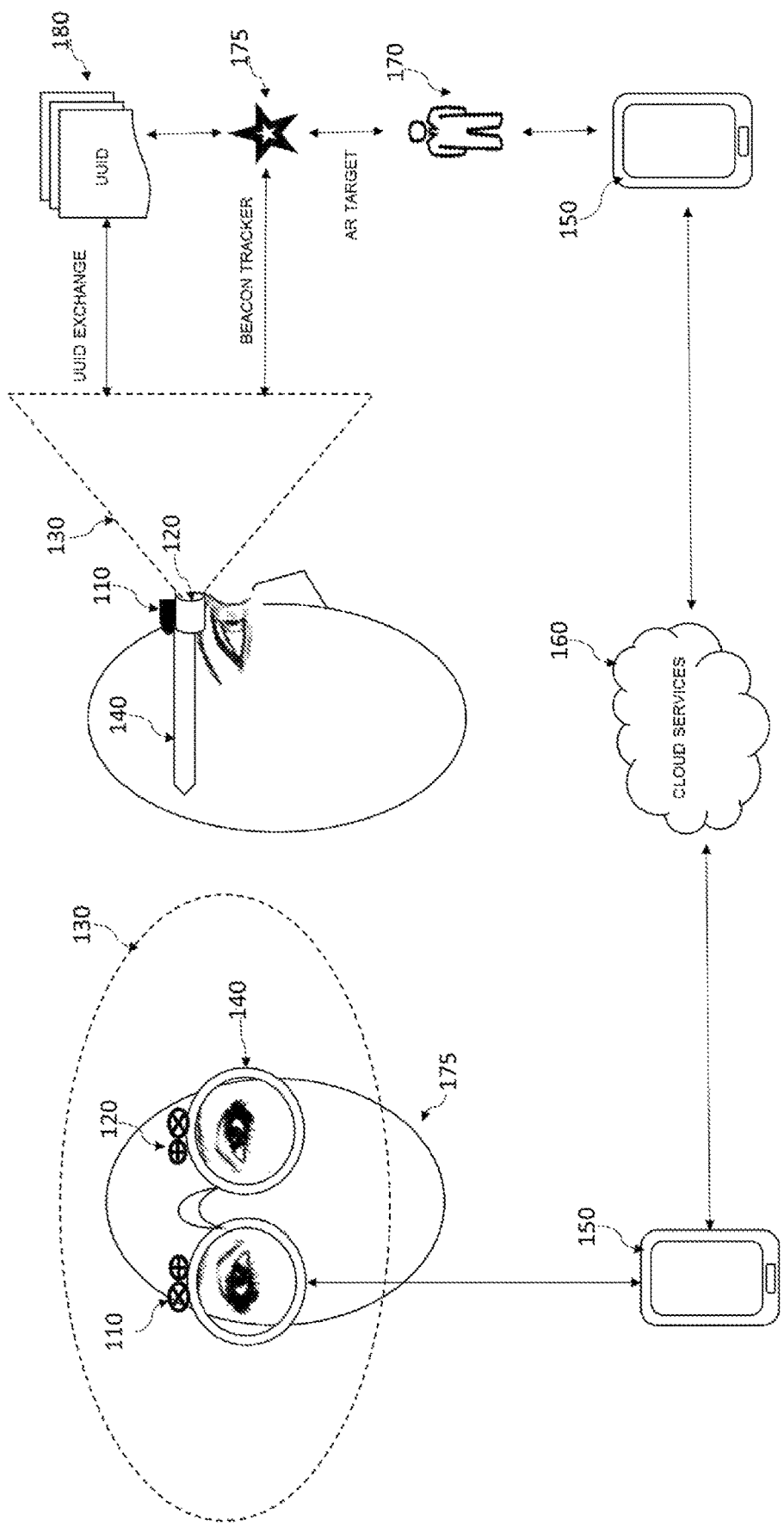
FIG. 1B is a first perspective view of a gaze initiated interaction technique in accordance with an example embodiment.

The schematic diagram in FIG. 1B depicts the hardware required in the scenario of a preferred embodiment of the present invention. Both persons taking part in the interaction are wearing a head-mountable device 140. The head-mountable device comprises both a beacon transmitter 110 and a beacon receiver 120. In a preferred embodiment both the beacon transmitter and the beacon receiver are configured to operate with light of the infrared spectrum. Both the transmitting and receiving beams are configured to coincide with the gaze of the user 130. Through the medium of the beacon beams two functions are being implemented. One such function is the exchange of the described anonymous unique identifiers 180. The other function is to track the point-of-interest beacon 175 in order to be able to project the corresponding beacon user 170 as an augmented reality target. In the preferred embodiment both interacting users 170 175 use a system which combines a head-mountable device with a smartphone-type handset 150. It is envisaged that all distributed functions with the exception of said beacon tracking and UUID exchange are processed by making use of cloud services 160 which are in turn accessed by functionality provided by the respective smartphone-type handsets 150.

Figure 2:
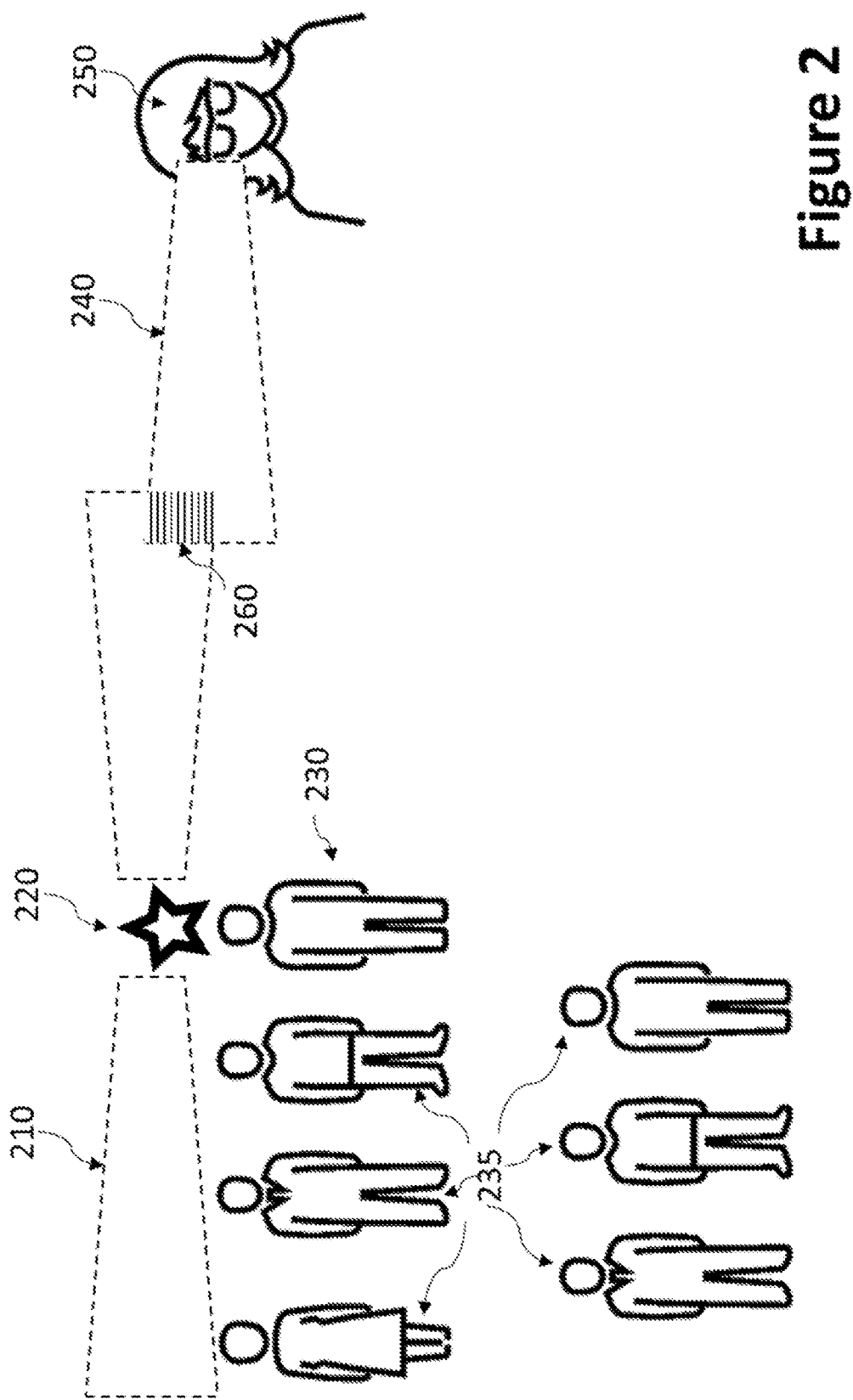
FIG. 2 is a frontal view illustrating a technique for utilizing interlocking gaze in respect of wearers of a head-mountable device.

FIG. 2 illustrates the gaze initiated interaction technique in the context of an augmented-reality setting whereby the figure depicts the first step of the technique comprising scanning the environment for other personal point-of-interest beacons in the field of view. The user 250 of a head-mountable device gazes in the direction of a crowd of people 235 whereby in the crowd there is a person 230 who operates a similar head-mountable device comprising a point-of-interest beacon 220. The beacon 220 disseminates a beam 210 corresponding to the gaze of the user 230. The first user 250 operates a similar beam transceiver corresponding to her gaze 240. Once an intersection of gaze-related beams 260 takes place, unique identifiers can be exchanged. In the depicted embodiment, however, it is sufficient if one of the users picks up the unique identifier of the beacon of the other user.

Figure 3:
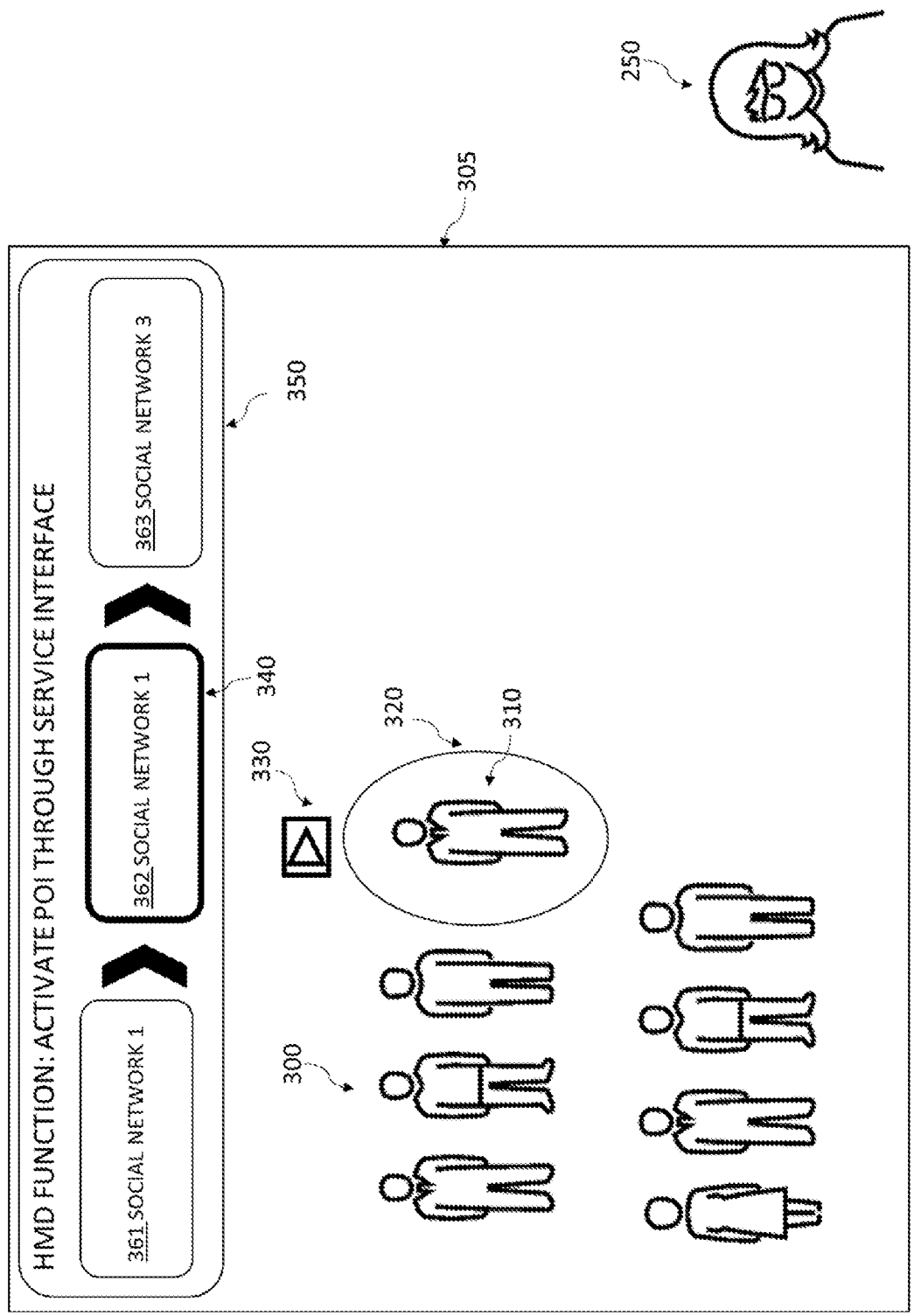
FIG. 3 illustrates an example embodiment relating to establishing contact with the user of a personal point-of-interest beacon.

FIG. 3 illustrates the gaze initiated interaction technique from the point of view of a user 250 at a point in time when authorization has been successfully performed on a plurality of social networks. The frame 305 depicts the boundary of the augmented-reality scene depicted. The frame contents simulate what the user 250 may see. Frame 350 denotes a menu panel superimposed on the augmented reality scenery.

Frame 340 denotes an individual selectable menu item. The scenery comprises a crowd of people which are not enhanced by augmented reality. There is one individual 310 in the crowd who is enhanced in the augmented reality environment. The enhancement consists of providing a means of tracking 320 the individual in the field of view. An icon 330 hovers above the tracked individual 310. The said icon denotes that the tracked individual 310 offers an invitation for interaction to the other user 250. At this point of the interaction process no interface for interaction is available yet. In the example the user 250 is notified that authorization has been granted for interaction with the point-of-interest by altogether three social networks 361 362 363. The said user is prompted to select over which one of the social networks offered as selection the proposed interaction is to take place. The selection of network is important for the reason that the interface offered for interaction will normally be different for each network. If for example, the point-of-interest grants authorization both for interaction over a social network designed for dating and a social network designed for professional networking, then it is to be expected that the corresponding interfaces are substantially different.

Figure 4:
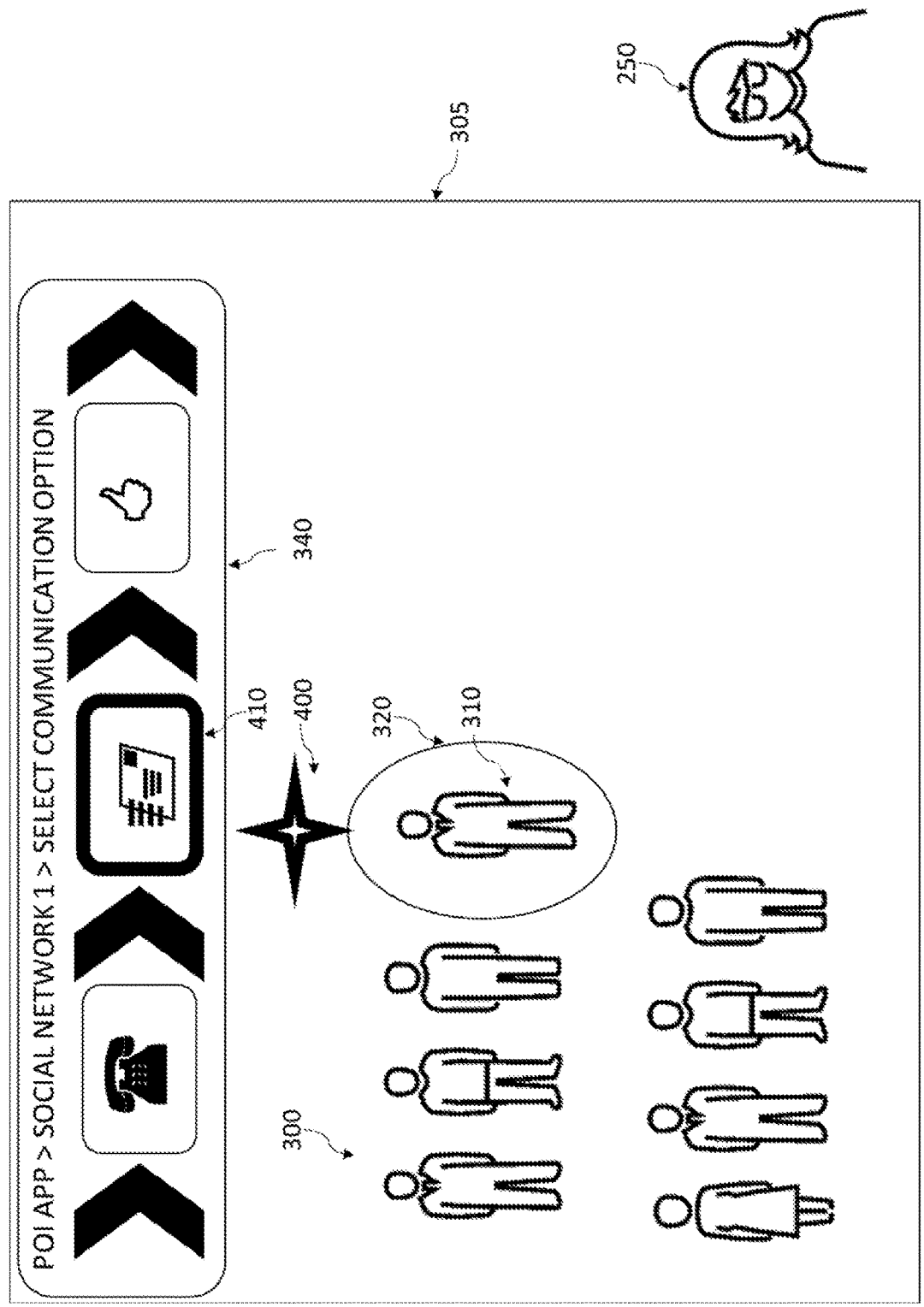
FIG. 4 illustrates an example embodiment relating to running an app on a head-mountable device relating to communications with the user of a personal point-of-interest beacon.

FIG. 4 depicts the use case started in FIG. 3 at the next phase of interaction. At this stage a preferred social network has been selected, the corresponding interface has been retrieved and an application has been launched which makes use of the said interface. Whilst the application is active a suitable icon 400 is projected above the tracked user 310 denoting that the currently active application interacts with said tracked user. Menu card 410 denotes an arbitrary interaction option, in this particular example the option to send a text message to the tracked user 310.

Figure 5:
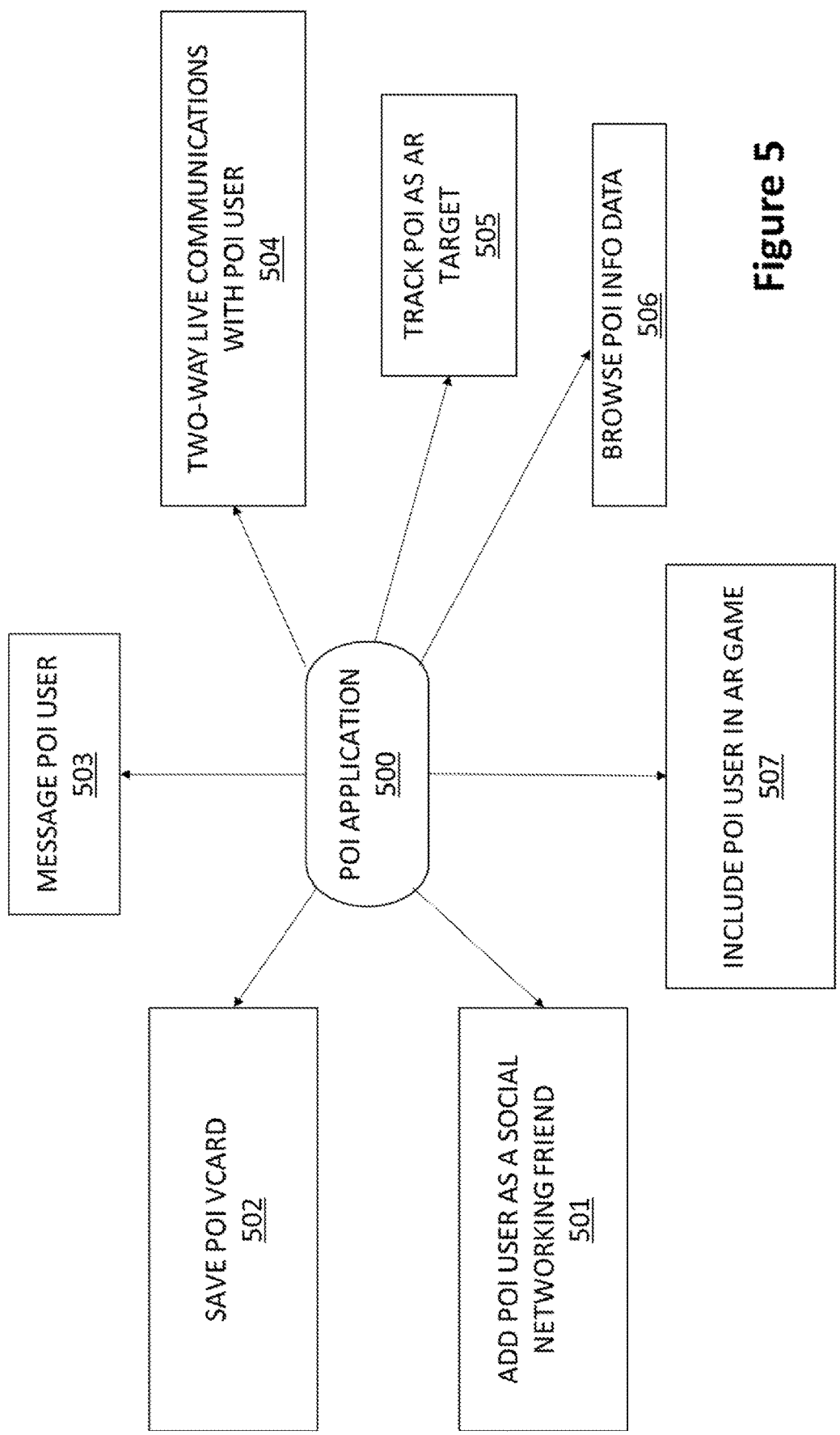
FIG. 5 is a block diagram depicting examples of the type of interaction which can follow acquisition of a personal point-of-interest beacon.

FIG. 5 is a block diagram providing more detail on preferred embodiments of the type of interaction between users of the gaze initiated interaction technique. Once an interface is obtained enabling contact to a personal point-of-interest beacon an application 500 is launched. The most basic application of that type would be one in which the second user is added as a friend 501 on the social network which has mediated the described authorization. Another possible application is the exchange of business cards, such as VCARDs 502. Sending a short text message 503 to the second user is another possible example application. In a similar way two way voice communications 504 may be initiated. The application may also restrict interaction simply to tracking the second user as an augmented-reality target 505. This use case would be particularly interesting in keeping track for example of a tour guide in a very crowded place. Another application would be to simply retrieve and browse profile attributes of the second user 506. In a gaming scenario it would be of particular interest to utilize the described gaze initiated interaction technique to initiate an application which allows to introduce a previously not acquainted member of the public into a running instance of an augmented reality game.

Figure 6:
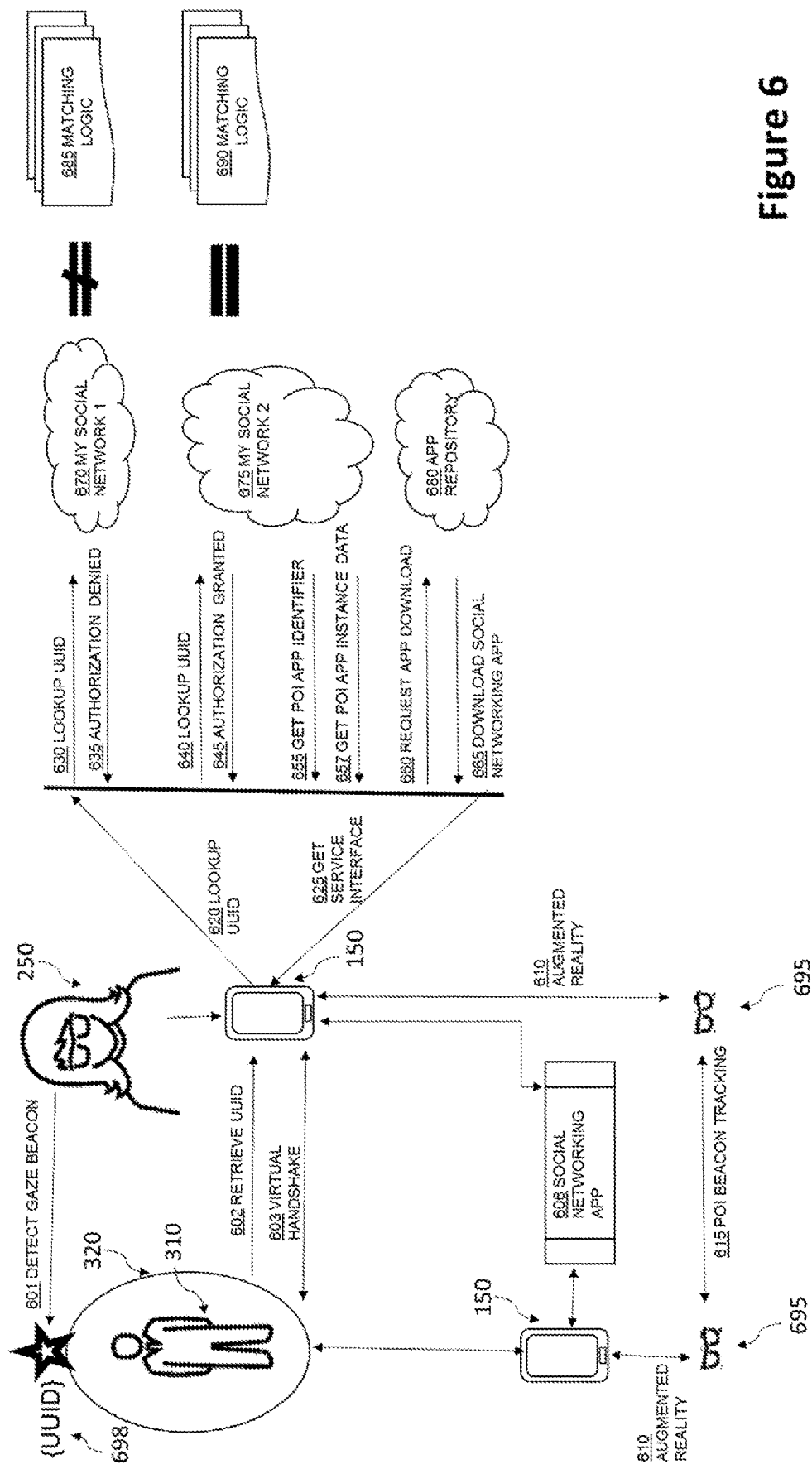
FIG. 6 is a flow diagram relating to an example embodiment depicting communications between two personal point-of-interest beacon users.

FIG. 6 describes an end-to-end use case of a gaze-initiated interaction between a first user 250 and a second user 310 in an augmented-reality environment. The second user 310 is operating a personal point-of-interest beacon transmitting an anonymous temporary unique identifier which is only known to one social network. Both the first and the second user use head-mountable devices 695 in combination with smartphone-type handheld mobile devices 150. The interaction starts with the first user 250 detecting the point-of-interest beacon 601 of the second user 310. Upon detection of the point-of-interest beacon the unique identifier of the beacon is retrieved. It has to be noted that a point-of-interest beacon may transmit more than one identifier. If that is the case, the following lookup process is repeated for each of the identifiers. In the described use case, however, it is assumed that only one unique identifier is being transmitted. For the next step the handset 150 of the first user 250 establishes a connection with the Internet in order to access a plurality of cloud services. From the point of view of the first user the input 620 for the lookup process is the unique ID 698 of the beacon relating to the second user, whereas the output 625 is a service interface to the second user. The steps required to retrieve the service interface based on the lookup of the unique identifier are as follows: at first the identifier is submitted 630 to a lookup service of a first social network 670, which is a social network on which the first user 250 has an account and a profile; if the unique identifier 698 is registered on that social network an algorithm 685 comprising a matching logic is executed, in such a way that the algorithm takes into account inclusion and exclusion criteria associated with both the profile of the first user 250 and the second user 310; the outcome of the matching process determines whether authorization is granted to the interaction request; in the present use case lookup process 630 returns a negative authorization result 635; the next steps comprise iterating through a plurality of social networks to which the first user 250 has subscribed; for each social network the lookup process is repeated; in the specific use case lookup 640 is successful since the matching algorithm 690 yields positive authorization and as a result the social network 675 grants authorization for interaction 645; once authorization has been obtained it is necessary to obtain an application for interaction, for that purpose the social network 675 is queried for the identifier of a suitable application; subsequently an identifier for the respective application is obtained 655; in order to be able to run the application instance data has to be obtained 657, also from social network 675; before the application can be launched it is necessary to ensure that the application itself is available on the mobile devices of the first user 250; in the present use case the application has not yet been installed and has to be requested 660 and downloaded from an online app repository 680. Once authorization has been granted and the application is running and has been provided with instance data, then the user 250 is notified that augmented-reality interaction with user 310 is possible through application instance 606. Both users 250 310 are queried to agree to a virtual handshake which initiates interaction through the app 606, if affirmed. For as long as the application 606 is active both users track each other in the augmented-reality environment 615.

Figure 7:
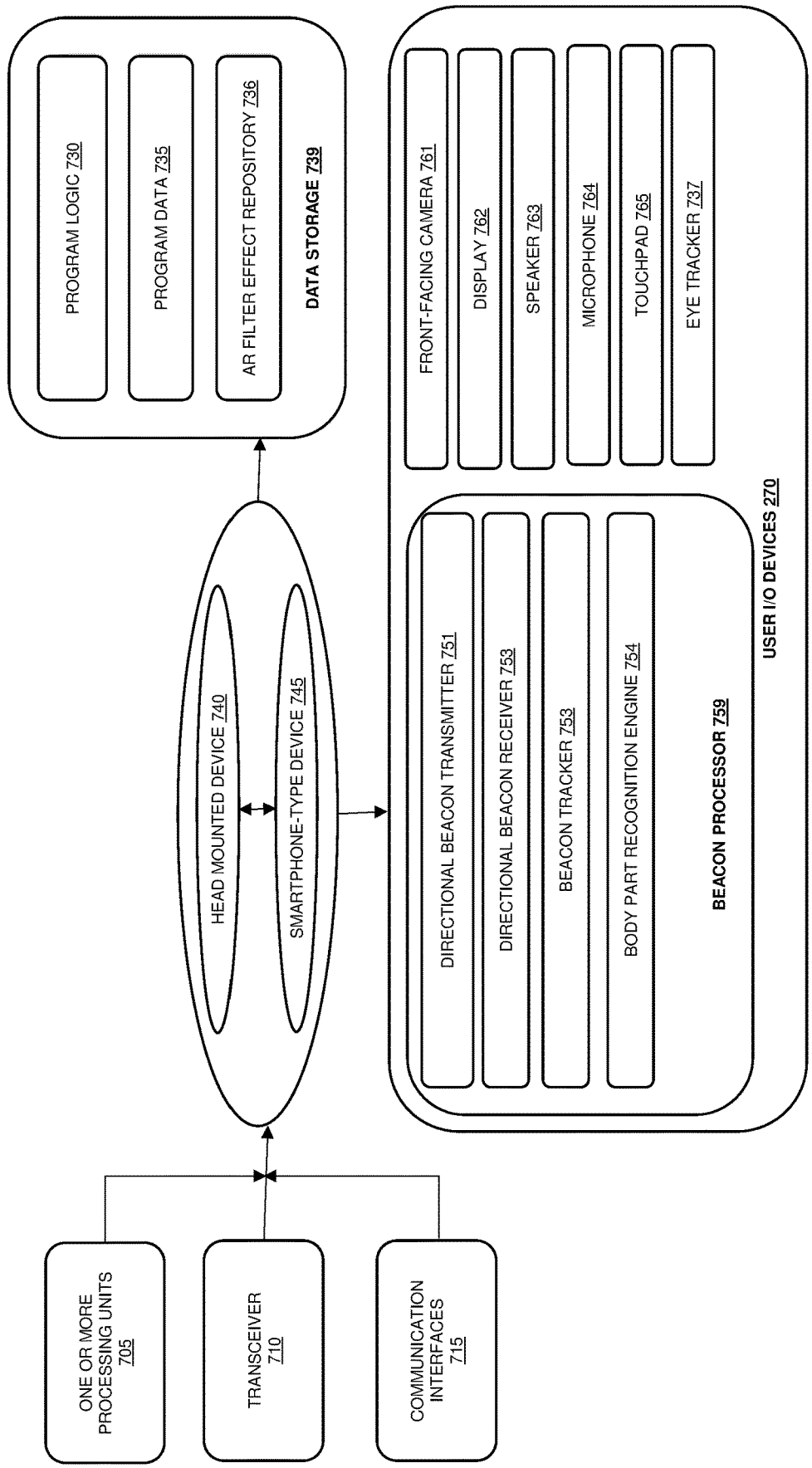
FIG. 7 is a block diagram depicting the system architecture of an example embodiment of a system utilizing a gaze initiated interaction technique.

FIG. 7 depicts the architecture of an example embodiment of a system implementing aspects of the novel gaze initiated interaction technique. The system comprises two mobile devices, namely a head-mountable device 740 and a smartphone-type mobile device 745. Both devices 740 745 are used in conjunction with each other and are thus treated as a single unit for the purposes of the system diagram. The system comprises one or more processing units 705, a transceiver 710 for mobile communications via the smartphone-type device 745 and a plurality of communication interfaces 715. The device comprises a data storage component 739, which in turn comprises stored program logic 730 and stored program data 735. The system also comprises a plurality of user input and output devices 270. The plurality of input and output devices comprises a beacon processor 759. The beacon processor comprises a directional beacon transmitter 751, a directional beacon receiver 753 and a beacon tracker 753. Other user input and output devices in the preferred embodiment are a front-facing camera 761, a display 762, a speaker 763, a microphone 764 and a touchpad 765.

A preferred embodiment of the invention may also store a repository of augmented reality (AR) filter effects 736. Such a repository comprises special effects with which the appearance of a person tracked in AR may be altered. Examples of such alterations are bunny ears, saintly halos, horns, beards, etc. These types of alterations are similar to the types of alterations popularized by Snapchat filters. The repository 736 may be pre-installed, or it may be accessed remotely, either through the cloud or any other suitable online repository of data. It can also be a combination. i.e. certain common AR effects may be pre-installed when the corresponding app is installed. Other AR effects may be personalized or heavily customized AR effects, which require a sourcing and downloading at runtime. For example, a social network friend of a user of the present invention may have created a fully personalized AR affect. So, when the social network friend needs to be tagged following a gaze-interlock event, the system queries the social network for an appropriate AR filter effect in order to tag that social network friend. The social network may respond with a suggested filter effect that is not one of the standard pre-installed filter effects. Hence the system has to then to download the effect from the social network and apply it to the social network friend, when tagging them following a gaze-interlock.

A preferred embodiment of the invention may also comprise an eye tracker 737. The eye tracker fulfills the function of being able to determine a gaze fixation of the user. An embodiment of the present invention uses the Tobii XR Eye Tracking System, but any other eye tracking system capable of determining a gaze fixation will be suitable also.

A preferred embodiment of the invention may also comprise a body part recognition engine 754. Such a body part recognition engine may be used to facilitate the placement of tags and/or AR filter effects to certain body parts following a successful social network mediated gaze interlock. A preferred embodiment of the invention has implemented the body part recognition engine by using the method first described in "Real-Time Human Pose Recognition in Parts from Single Depth Images", by J. Shotton et al. (Microsoft Research Cambridge & XBox Incubation). An embodiment of the present invention hence enables body part recognition by utilizing an object recognition approach which includes designing an intermediate body parts representation that maps the difficult pose estimation problem into a simpler per-pixel classification problem. A large and highly varied training dataset allows the classifier to estimate body parts invariant to pose, body shape, clothing, etc. Confidence-scored 3D proposals of several body joints are generated by reprojecting the classification result and finding local modes. Those skilled in the art will realize that other methods of recognizing body parts are equally valid in order to practice the invention.

Figure 8:
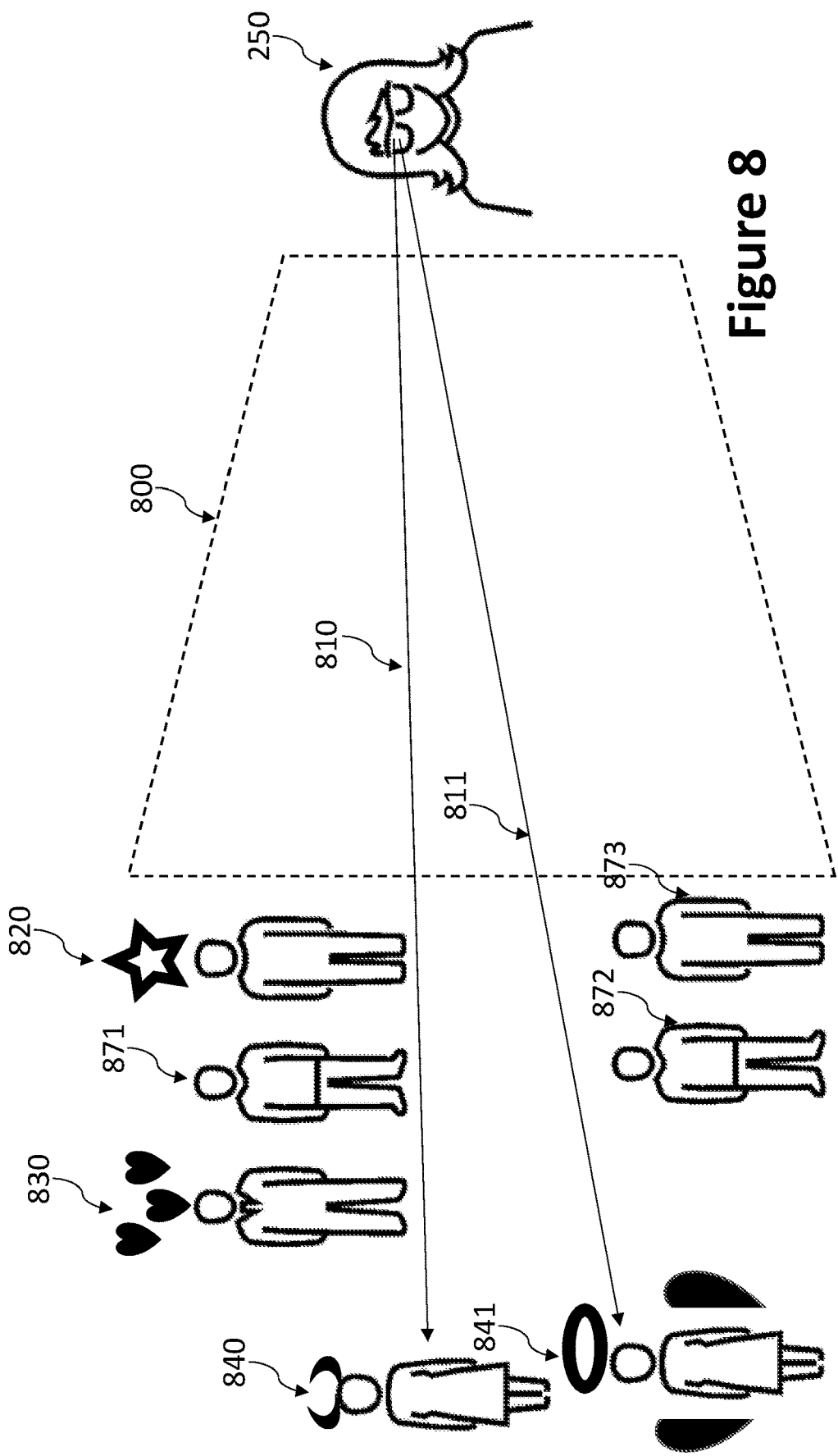
FIG. 8 illustrates an example embodiment relating to running an app on a head-mountable device where persons involved in gaze-interlock events are tagged by using augmented reality filters.

FIG. 8 depicts an example embodiment, where instead of just tagging a tracked user with projecting icon 400 above the head of the user (see FIG. 4), a novel way of tagging a tracked user involves deploying AR filter effects. Such AR filter effects, may be similar to the familiar Snapchat filters, such a projecting bunny ears, cute dog faces, saintly halos, beards, mustaches, etc., onto the head of a person. In a significant inventive departure, the present inventor has realized that it is desirable that the person being tracked chooses themselves, how they want to be tagged in someone else's AR. In Snapchat and other similar prior art embodiments, a third person being subject to AR filters being applied has no such control. In the prior art it is the camera operator who control what AR effects are applied to AR subjects being recorded with the camera. Therefore, one of the novel and useful features of the present invention is that it gives the AR target full autonomy over if and how they appear in the augmented reality of another person. One of the features of the present invention is to give a third person, who may be completely unknown to the person operating the camera, the power to decide how AR filters are applied to them in someone else's AR. Hence a user of the invention 250 is looking at a crowd of people in her field of view 800. The user 250 may be operating a smartphone or head mounted AR googles in order to view the AR-enhanced scene. Other embodiments are possible, i.e. the user 250 may use any device which is capable of providing an augmented reality experience. A preferred embodiment uses a Samsung Galaxy S7 smartphone with an app capable of using the in-built video camera to screen a scene in real time to the in-built display screen and using image processing technology to track persons and to add AR filters which enhance the appearance of a person, as viewed in AR. After the detection of gaze-interlock events, the system queries one or more social networks with the identifiers gained through the gaze-interlock events. In a preferred embodiment these identifiers are anonymous in the sense that only the social network is able to resolve the identifier to a person, hence the identifiers have no meaning outside the social network. However, those skilled in the at will realize that the invention may also be practiced with identifiers that are not anonymous. An example would be a name tag that is worn and then picked up and image-processed by the AR device. The human face can also serve as an identifier. In such a way it is possible to use face recognition to map faces against user IDs of social network users. It is also possible to use biometrics of the AR target, as picked up by the camera of the AR device, as an identifier suitable for querying a social network following a gaze-interlock event. It is also possible to use a voice signature as a key. The social network may then return instructions if and how the persons associated with the anonymous identifiers may be tagged with AR filter effects. The instructions on if and how a person is to be tagged, may be based on the user preferences of the tagged person as laid down in the user preferences of their social network account. In the particular example, AR subject 871 is not tagged, because there simply has not been a gaze-interlock event yet, which may be the precondition for tagging. AR subject 872, however is absent tagging for a different reason. AR subject 872 has set their preferences so, that only existing social network friends are permitted to enhance their appearance by AR tagging. User 250, however, is not a social network friend of AR subject 872. For AR subject 873 there is yet another reason why they are not tagged following a gaze-interlock event. AR subject 873 is mainly interested in social networking for romantic reason, similar to using the Tinder social network when looking for a new partner. AR subject 873 is conscious of the need to separate their private life from their professional life. Hence AR subject 873 has defined their preferences on their social networking account in such a way that they only want to be tagged following a gaze-interlock event during certain times of the day, say 7 pm-4 am for example. Alternatively, they may have defined geolocation where they either want to the tagged, or they do not want to be tagged following a gaze-interlock event. So, AR subject 873 in the example has decided that they want to disallow tagging inside the perimeter of their university campus between the hours of 9 am to 5 pm Monday through Friday. Therefore, even though user 250 and AR subject 873 are a match, i.e. tagging would normally permitted, the match is effectively voided by the time and geolocation restrictions as set in the social network account user preferences of AR subject 873.

AR target 820 is tagged with a standard icon floating in the vicinity of the AR target, following a gaze-interlock event. The standard icon can be anything that indicates to the user that the AR target has been subject to a gaze-interlock, such as an arrow, a star, or a circle, for example. It is also advantageous to use an icon of the social network which has recognized the anonymous identifier. For example, an anonymous identifier has been picked up after a gaze-interlock and the identifier has been sent to the Facebook and the Snapchat social networks for the initial query. If Snapchat returns authorization for tagging and Facebook does not return such authorization, then an embodiment of the invention uses the Facebook icon for tagging. Another embodiment solves the problem of how to tag the AR target, when more than one of the social networks returns authentication for tagging. Said embodiment displays the icons of the respective social networks on a rotating carousel displayed in the vicinity of the AR target. Another embodiment relies on preferences set by the user of the AR device. Said user indicates preferences regarding which social network has precedence over which other social network, depending on which circumstances. For example, such a preference is to give the LinkedIn professional social network precedence over a personal social network such as Facebook during working hours. After working hours and on weekends, the user may indicate that personal social networks have precedence over professional social networks. In one embodiment a user may decide to block certain social networks depending on certain parameters, such as time, date or geolocation. For example, the user may indicate that the Tinder social network for dating is blocked from displaying tags, if a gaze-interlock occurs in the geolocation associated with a workplace.

AR target 830 is enhanced with a Snapchat-like filter, in this case a floating animation of a burst of little love hearts. Therefore, the AR target 830 has instructed one social network that they wish to be tagged in such a way, following a successful social network mediated gaze interlock. In the particular example of the embodiment AR target 830 has indicated to the Tinder social network that they wish to be tagged with love heart filter effects should there be a gaze interlock with a defined set of social networking friends. AR target 830 has conversely indicated that other tags and/or filters should apply to another set of social networking friends. In the example, AR user 830 has also indicated that they wish to be tagged with the love heart filter by other users of the Tinder social network, provided that certain exclusion and inclusion criteria apply. In the example AR target 830 has indicated to the social network that they wish to be tagged with the love hearts filter effect, if a gaze-interlock occurs with another user of the same social network who is male, between 18 and 25 years old, who possesses an popularity rating of greater than 4.5 on that social network and who is not on their personal exclusion list. In the example all of these criteria apply and hence AR target 830 is tagged with a love hearts filter effect following a successful gaze-interlock event.

In a preferred embodiment, the AR filter effects which are applied following an authenticated gaze-interlock are even more elaborate. The preferred embodiment also makes use of eye tracking module 737 in order to determine a gaze fixation of the user. After a successful social network authenticated gaze interlock a dynamic filter effect is applied, which is dependent on the gaze-fixation in relation to the body of the AR target. In other words, the filter effect dynamically changes, dependent on which part of the body or face of AR user 840 is subject to a gaze fixation 810. In the example of a social network for casual dating, such as Tinder, an example embodiment of the present invention is capable of applying an "innocent little angel" filter effect when the gaze fixation 811 is on the face of AR target 840, but it changes to a "horny little devil" filter effect when the gaze fixation 810 is directed to other parts of the body of AR target 841. In a preferred embodiment an Easter Egg feature is included. While the term Easter egg has been used to mean a hidden object for some time, in reference to an Easter egg hunt, it has come to be more commonly used to mean a message, image, or feature hidden in a video game, film, or other, usually electronic, medium. The present inventor has realized that it is useful to enable Easter Eggs for gaze-interlock initiated social interactions in augmented reality. The present inventor has conducted market research which has led to the conclusion that the possibility of searching for Easter Eggs and finding those in unexpected situations and locations can be a major driving factor in adoption of augmented reality in the first place. Hence a preferred embodiment of the present invention allows the user to hide Easter Eggs, which can be discovered following a gaze-interlock event. In Easter Egg mode a social network user can define an effect, primarily an AR filter effect, but sounds are also possible, which is to be applied under certain defined circumstances. In order to hide such Easter Eggs, it can be selected that no social network icon is to be displayed following a successfully authenticated gaze-interlock. Instead an AR target is tracked in dark mode, i.e. such tracking is hidden from the AR user. Only when the predetermined parameters, as set by the AR target, are met, then the Easter Egg is revealed. Such parameters can be a certain time or date, e.g. Halloween, or a geolocation, e.g. a particular nightclub, or a particular gaze fixation on the face or on a specific body part of the AR target, or any combination thereof.

Figure 9:
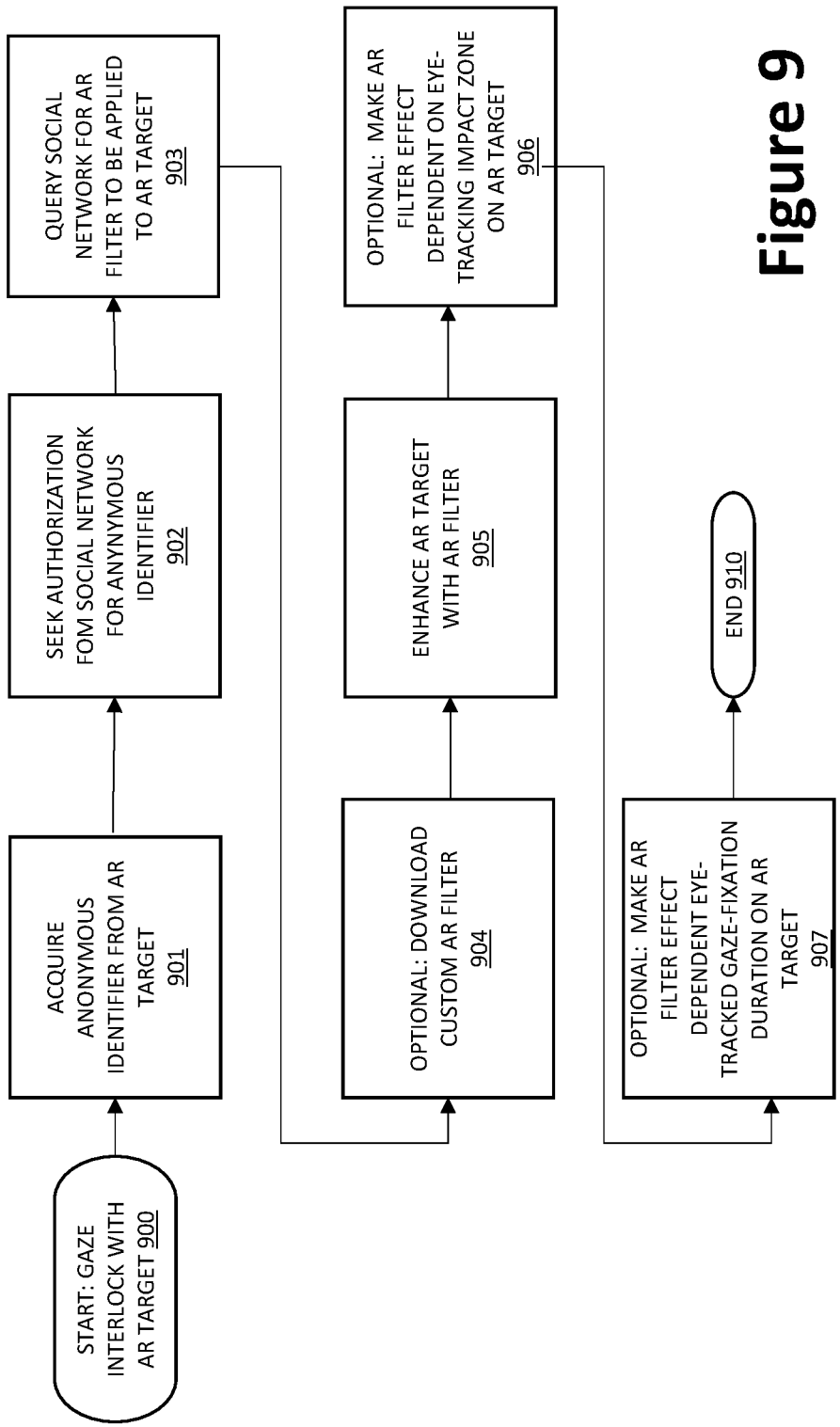
FIG. 9 is a flow diagram relating to an example embodiment performing augmented reality filter type tagging.

FIG. 9 is a flow diagram, which indicates the sequence of actions when a gaze-interlock with an AR target has been detected. Please note that the essence of the invention is still met if the order of sequence of actions is rearranged. The particular order depicted in FIG. 8 relates to an example embodiment of the present invention. The sequence starts with a gaze-interlock being detected in relation to an AR target 900. The gaze-interlock can be detected in a variety of way, with personal beacon technology, such as infrared or near-infrared spectrum beacons in a preferred embodiment, or with beacon based on wireless transmitters, such as Bluetooth-related technology. Detection may also be accomplished by image-processing means, which comprise using the on-board camera 761 to analyze the scene which is subject to AR. Face-recognition technology may be used to extract parameters from the face of an AR target, using these parameters to generate a key and then querying a social network with that key in lieu of the UUID transmitted by beacon. It is also possible that the AR target has QR code type sticker with a UUID attached to their clothing. Generally the invention may be practiced with any means of AR target being able to provide a key suitable for querying a social network with, wherein the key should ideally not allow the user to look up the identity of the AR target without prior authorization by the social network. Also the AR device may be any device capable of viewing an AR-enhanced scene of the real world. This includes special AR head mounted devices, such as Google Glass. It also includes smartphones whereby the inbuilt cameras record a real-world scene, which is then enhanced by the built-in processors and finally displayed on the main display of the smartphone. Hence step 901 acquires an anonymous identifier from an AR target. Next 902, authorization is sought from one or more social networks for permission to tag the AR target. Such authorization is sought by providing the social network with the detected identifier along with with the username, or other kind of ID, which the device user has on the same social network. Any alternatives are equally suitable as long as the social network may be able to link both the AR user and the AR target to respective social network accounts. Optionally, if the AR user has no account on the social network yet, then just the identifier of the AR target may be transmitted to the social network when authorization for AR tagging the AR target is sought. After authorization has been granted by the social network, then for the next step 903, the social network is queried for an appropriate AR filter to be applied to the AR target. It is possible that the social network returns just the key for such a filter, in case it is an AR filter which is a standard filter, which may come pre-installed with the social networking app on the user's device. It is also possible that the required AR filter is a custom AR filter, in which case it needs to be downloaded from the social network in step 904. In certain embodiments of the invention AR targets can define their own custom filters. Snapchat presently offers the users of its social network to create custom filters and "lenses". Step 904 involves downloading these types of filters or "lenses" to the AR-enabled device following a gaze-interlock event with an AR target, where the AR target has indicated in their social networking preferences that they want to be tagged with their own custom filters or "lenses", following a successfully authenticated gaze-interlock. Step 905 involves enhancing the successfully authenticated AR target with an AR filter. It is optional to make the AR effect dependent on the eye-tracking impact zone on the AR target, as is outlined in step 906. Hence the AR target is able to specify in their social network account preferences if the AR filter effect is supposed to be different for gaze-fixations on different parts of the body or face of the AR target. For example, an AR target might specify to their social network that they want the Clark Kent-style filter to be applied when someone looks at their face following a successful gaze-interlock, and a Superman-style filter to be applied when someone looks at their body instead. Hence in step 906 the system may receive AR tagging instructions from the social network, following a successful gaze-interlock, on the specific filter to be applied conditional on a gaze fixation on a particular body part or face part. Another option is detailed in step 907. This option makes it possible to use the duration of a gaze fixation as another parameter for specifying transitions for filter effects. As an example, the AR target may have instructed the social network to switch from the Clark Kent-style filter to the Superman-style filter after a gaze-fixation duration of at least three seconds. The AR target may additionally specify that the Superman-style filter may only be applied one single time. Hence this would be an effect when the AR user sees the AR target make a completely unexpected and totally surprising brief one-time only filter transition, following a gaze-interlock. The described control sequence ends with 910.

The present inventor has realized that one of the primary reasons for using this kind of augmented reality in the first place is to be surprised by totally unexpected filters. In traditional social networking, no such surprise effects are known. If social networking in augmented reality were to simply repeat the conventional social networking functions, then not much added value would entice a user to enter augmented reality in the first place. It is a critical inventive departure from the prior art, that the AR user is being constantly surprised by witty AR filters that the AR targets have prepared, sometimes with great effort. Therefore, this novel approach to social networking in augmented reality gives AR targets novel ways for self-expression and autonomy in connection with the fundamental human interaction of gaze-interlocks. In the past somebody might have discretely winked, blinked or smiled in encouragement or acknowledgement if their gazes were meeting with those of another person. With the innovative technology of the present invention, much more sophisticated ways of responding to such gaze-interlocks are possible.

Figure 10:
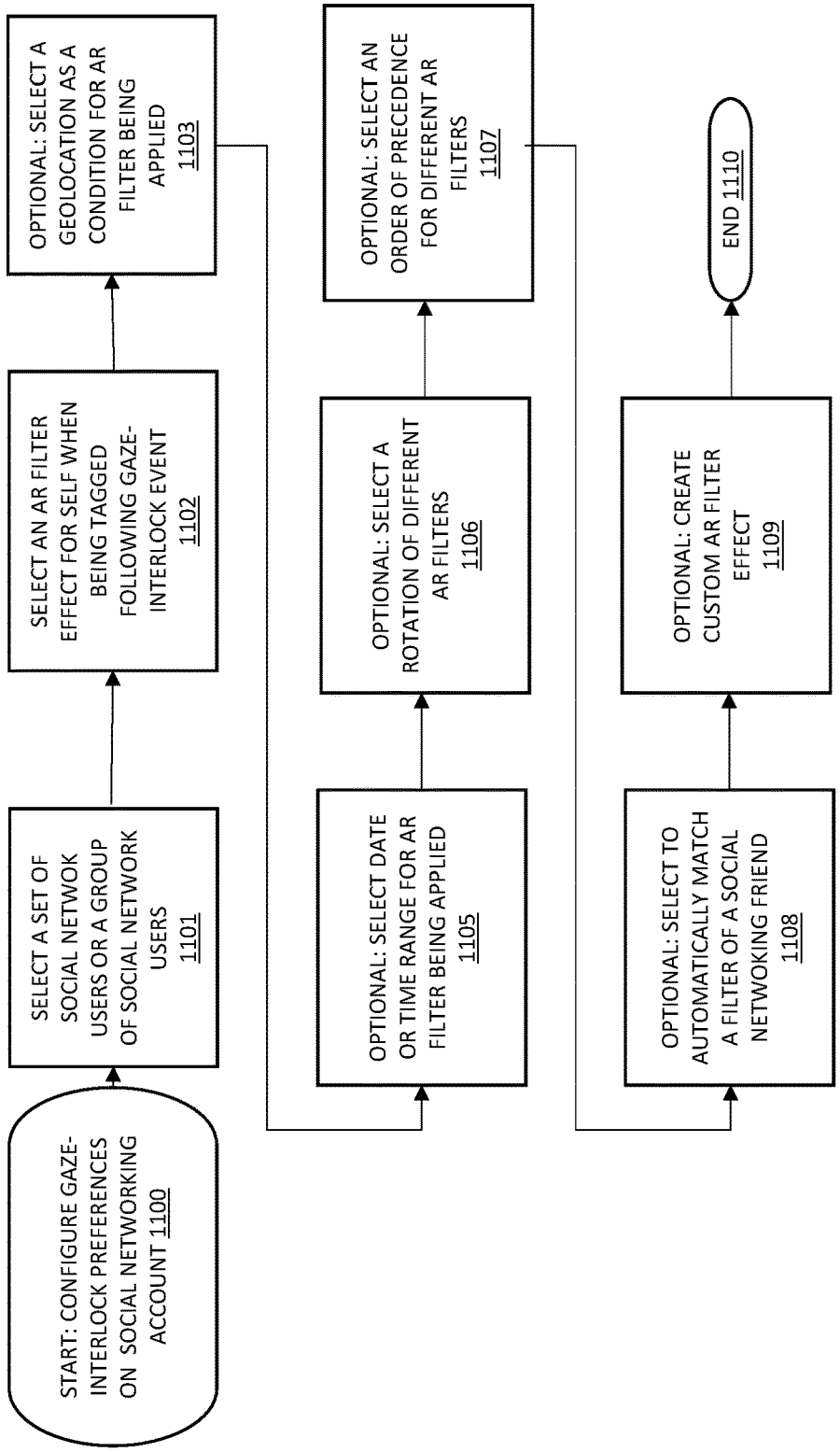
FIG. 10 is a flow diagram relating to an example embodiment performing configuration of gaze-interlock preferences on a social networking account.

FIG. 10 is a block diagram representing the use case of configuring gaze-interlock preferences on a social networking account 1100. Those preferences relate to how a social network user wishes to be tagged by other AR users following a successfully authenticated gaze-interlock. Please note that the order of the steps relates to an example embodiment. Individual steps may be left out or may be rearranged in a different order. The first step 1101 may involve selecting a set of social network users or a group of social network users. The rules which may be defined in the subsequent steps then apply to that selection. A group of social network users may comprise a list of specific social network friends. A group of social network users may comprise social network users who are not yet personally known to the social network user but who should be included when tagging rules are defined in the following step. An example of such a group would be a Facebook group, i.e. a group on a social network which has an owner who can decide on the admission policy for that group. Another example of a group is an attribute-based or category-based group. Such a group could be anybody for example, who lists their profession as teacher on their social network profile, or anyone who lists Miami as their hometown on their social network profile. A group could also be defined around attributes such as age, nationality or sex, e.g. all users on the social network who are male, between the ages of 18 and 25, and who live in the United States. It is important to note that the sets which are defined in step 1101 may be inclusion sets, exclusion sets, or a combination of both. In other words, the social network user needs to be able to define not just who is allowed to tag them and/or apply AR filter to them, but the user also needs to be able to define who is not allowed to tag them and/or apply AR filters to them. Then step 1102 involves selecting an AR filter for self when being tagged following a gaze-interlock event. The AR filter relates to the set selected in the previous step 1101. Hence what is defined is which set of other social network users can see oneself in augmented reality with the specific AR filter effect which is chosen in step 1102. Step 1103 is optional; it defines if the AR filter effect is only be applied in a certain geolocation. Both included and excluded geolocations are possible. As an example, a user can specify: "Apply Superman filter after a gaze-interlock, but only when I am not at my workplace".

Step 1105 is optional; it defines if the AR filter effect is only be applied on a certain date or time range. Both included and excluded date or time ranges are possible. As an example, a user can specify: "Apply Superman filter after a gaze-interlock, but only on Halloween or when it is my birthday".

Step 1106 is optional; it defines if the AR filter effect is to be rotated according to a certain user-defined rule. As an example, a user can specify: "Apply 'mermaid' filter when it is a rainy day according to the local weather forecast and apply 'cool sunglasses' filter when is a sunny day according to the local weather forecast".

Step 1107 is optional; it defines if there is an order of precedence when the rules defined in the previous step return more than one possible filter. As an example, a user can specify: "If after a gaze-interlock both a Tinder icon and a LinkedIn icon may be used as tags, then give precedence to the tag with the LinkedIn icon and do not show any other possible tags".

Step 1108 is optional; it defines if the AR filter of a social networking friend is to be matched. As an example, a user can specify: "If after a gaze-interlock with a social networking friend who uses a Batman-style AR filter tag for themselves, then apply a Robin-style AR filter tag to myself". It is important to note that in this context the matching can be automatic, in the sense that the social network provides pre-defined lists of matching filters for tagging after a gaze interlock. For example the social network, may already pre-define that a good automatic match for a "Superman"-style filter of a first social network user is a "Batman"-style filter if the second social network user happens to be male or a "Wonderwoman"-style filter if the second social network user happens to be female.

Step 1109 is optional; it allows a social network user to create their own a custom AR filter effect which is to be applied after a gaze-interlock.

The list of steps is not final; it is possible to configure other gaze-interlock tagging preferences on a social networking account.

The block sequence ends with block 1110.

Unless otherwise defined, all technical and scientific terms used herein have the same meaning as commonly understood by one of ordinary skill in the art to which this invention belongs. Although methods and materials similar to or equivalent to those described herein can be used in the practice or testing of the wink gesture based control system, suitable methods and materials are described above. All publications, patent applications, patents, and other references mentioned herein are incorporated by reference in their entirety to the extent allowed by applicable law and regulations. The gaze initiated interaction technique may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A device for social networking in augmented reality, the device comprising:
    a camera for capturing optical data wherein said data, when processed by one or more processing units, is capable of yielding an identifier wherein said yielding is contingent on a field of view of a person having comprised a line of sight to said device during a capture of said optical data and wherein said identifier is a person-specific identifier and wherein said person is not an operator of said device; and
    said processing units, configured in such a way that, conditional on the detection of said identifier:
    said processing units cause one or more social networks to be queried with said identifier and wherein said processing units causes said person to be tagged in augmented reality and wherein said tagging is conditional on a response to said querying.

2. The device of claim 1 further comprising an eye tracker and a body part recognition engine; and wherein an application of one or more augmented reality filter effects is additionally dependent on a part of the body or a part of the face of said person, wherein said part of the body or part of the face has been detected by the eye tracker to be subject to a gaze-fixation.

3. The device of claim 2 wherein said augmented reality filter effect is additionally dependent on the duration of said gaze-fixation.

4. The device of claim 1 wherein said response comprises instructions for the application of one or more augmented reality filter effects in relation to said person.

5. A method for a social network to mediate social interaction in augmented reality, the method comprising:
    receiving from a first user an instruction for one or more augmented reality enhancements to be applied to said first user when said first user is tagged in an augmented reality of a second social network user; and
    associating a unique identifier with an account of said first user; and
    making accessible for the second social network user a non-transitory computer readable memory having recorded thereon software for execution by a mobile computer, the software including instructions, wherein said instructions are capable of causing optical data to be captured and detecting said unique identifier in said optical data; and
    receiving said identifier from said computer; and
    in response to receiving said identifier, sending instructions to said computer, wherein said instructions comprise instructions to apply said enhancements when said first user is tagged in the augmented reality of said second user.

6. The method of claim 5 further comprising:
    receiving from said first user a selection of a geolocation as a condition of said one or more augmented reality enhancements being applied, wherein said condition can be either an including or an excluding condition.

7. The method of claim 5 further comprising:
    receiving from said first user a selection of a date or a time or a range of dates or a range of times or a range of timestamps as a condition of said one or more augmented reality enhancements being applied, wherein said condition can be either an including or an excluding condition.

8. The method of claim 5 further comprising:
    receiving from said first user a selection of a rule-based rotation of a plurality of said one or more augmented reality enhancements, wherein said rules comprise the order and the timing of said rotation.

9. The method of claim 5 further comprising:
    receiving from said first user a selection of an order of precedence in relation to said one or more augmented reality enhancements.

10. The method of claim 5 wherein said augmented reality enhancements comprise augmented reality filter effects.

11. The method of claim 5 wherein said augmented reality enhancements comprise the presentation of profile attributes of said first user.

12. The method of claim 5 wherein said augmented reality enhancements comprise a menu panel which is superimposed on said augmented reality.

13. The method of claim 12 wherein said menu panel comprises a plurality of menu cards and wherein said menu cards offer selections selected from the group consisting of: browsing information comprised in a user profile of said first user, messaging said first user, including said first user in a game, adding said first user as a friend, and saving a VCARD of said first user.

14. The method of claim 5 further comprising receiving from said first user one or more matching criteria and wherein said tagging is conditional on said second user having a social network profile which is a match for said matching criteria.

15. A non-transitory computer readable storage medium having data stored therein representing software executable by a computer, the software including instructions to process gaze interlock events, the storage medium comprising:
- instructions for receiving event notifications from a detector for gaze-interlock events wherein said events are triggered when a field of view of a person comprises a line of sight to the detector and wherein said person is not an operator of a device comprising said detector; and
- instructions for tagging said person on an augmented reality device with an augmented reality filter effect, wherein said tagging is contingent on the detection a gaze-interlock event and wherein said tagging is conditional on the responses received from one or more queries to one or more social networks, wherein said queries are parametrized with an identifier obtained from said detector and wherein said identifier relates to said person.

16. The non-transitory computer readable storage medium of claim 15, wherein said augmented reality filter effect is additionally dependent on a part of the body or a part of the face of said person, wherein said part of the body or part of the face has been detected to be subject to a gaze-fixation by a human operator of said augmented reality device.

17. The non-transitory computer readable storage medium of claim 16, wherein said augmented reality filter effect is additionally dependent on the duration of said gaze-fixation.

18. The non-transitory computer readable storage medium of claim 15, wherein said augmented reality filter effect is additionally dependent on the geolocation of the gaze-interlock event.

19. The non-transitory computer readable storage medium of claim 15, wherein said augmented reality filter effect is additionally dependent on the date of the gaze-interlock event or the time of the gaze-interlock event.

* * * * *